United States Patent
Lee et al.

(10) Patent No.: US 10,289,831 B2
(45) Date of Patent: May 14, 2019

(54) DISPLAY DRIVER INTEGRATED CIRCUIT FOR CERTIFYING AN APPLICATION PROCESSOR AND A MOBILE APPARATUS HAVING THE SAME

(71) Applicant: SAMSUNG ELECTRONICS CO., LTD., Suwon-si, Gyeonggi-do (KR)

(72) Inventors: Hyun-Chul Lee, Seoul (KR); Hyojin Kim, Hwaseong-si (KR); Jae-Wook Lee, Seongnam-si (KR); Sooyoung Woo, Hwaseong-si (KR); Kyu-Sam Lee, Hwaseong-si (KR)

(73) Assignee: SAMSUNG ELECTRONICS CO., LTD., Suwon-si, Gyeonggi-Do (KR)

(*) Notice: Subject to any disclaimer, the term of this patent is extended or adjusted under 35 U.S.C. 154(b) by 314 days.

(21) Appl. No.: 15/168,536

(22) Filed: May 31, 2016

(65) Prior Publication Data

US 2017/0019250 A1    Jan. 19, 2017

(30) Foreign Application Priority Data

Jul. 17, 2015 (KR) .................. 10-2015-0101774

(51) Int. Cl.
| | |
|---|---|
| *H04L 9/06* | (2006.01) |
| *G06F 21/44* | (2013.01) |
| *H04L 9/32* | (2006.01) |
| *H04W 12/12* | (2009.01) |
| *H04W 88/02* | (2009.01) |
| *H04W 12/10* | (2009.01) |

(52) U.S. Cl.
CPC .......... *G06F 21/44* (2013.01); *H04L 9/3226* (2013.01); *H04L 9/3263* (2013.01); *H04W 12/12* (2013.01); *H04W 88/02* (2013.01); *H04W 12/10* (2013.01)

(58) Field of Classification Search
None
See application file for complete search history.

(56) References Cited

U.S. PATENT DOCUMENTS

| | | | |
|---|---|---|---|
| 5,952,929 A * | 9/1999 | Yasushi .................. | G08B 21/06 180/272 |
| 7,206,429 B1 * | 4/2007 | Vossler ................ | H04R 1/1033 181/130 |
| 8,855,310 B2 | 10/2014 | Kirkup et al. | |
| 9,760,719 B2 * | 9/2017 | Bao ........................ | G06F 21/602 |
| 2005/0071282 A1 * | 3/2005 | Lu ........................... | G06F 21/42 705/64 |

(Continued)

FOREIGN PATENT DOCUMENTS

| | | |
|---|---|---|
| JP | 2006276709 A * | 10/2006 |
| KR | 1020130041033 | 4/2013 |

(Continued)

*Primary Examiner* — Lynn D Feild
*Assistant Examiner* — Richard A McCoy
(74) *Attorney, Agent, or Firm* — F. Chau & Associates, LLC

(57) ABSTRACT

A display driver integrated circuit includes a seed generation block configured to generate a seed, an encryption block configured to encrypt the seed and generate a first encryption text, and a comparison block configured to receive a second encryption text, in which the seed is encrypted, from an application processor, compare the first encryption text with the second encryption text, and output a control signal based on the comparison result.

20 Claims, 10 Drawing Sheets

(56) References Cited

U.S. PATENT DOCUMENTS

| | | | |
|---|---|---|---|
| 2005/0172118 A1* | 8/2005 | Nasu | G03G 21/04 713/156 |
| 2007/0116425 A1* | 5/2007 | Hatanaka | G06F 21/10 386/252 |
| 2007/0168674 A1* | 7/2007 | Nonaka | G06Q 20/341 713/182 |
| 2008/0263362 A1* | 10/2008 | Chen | G06F 21/31 713/184 |
| 2011/0313882 A1* | 12/2011 | Barthes | G06Q 30/00 705/26.25 |
| 2012/0233233 A1* | 9/2012 | Chandra | G06F 7/588 708/251 |
| 2013/0073840 A1 | 3/2013 | Kim | |
| 2013/0230171 A1* | 9/2013 | Ivanchykhin | H04L 63/108 380/259 |
| 2014/0184471 A1 | 7/2014 | Martynov et al. | |
| 2014/0310240 A1* | 10/2014 | Meng | G06F 9/466 707/615 |
| 2014/0359274 A1 | 12/2014 | Kirkup et al. | |
| 2015/0089636 A1 | 3/2015 | Martynov et al. | |
| 2015/0268778 A1* | 9/2015 | Okamura | G06F 3/0412 345/173 |
| 2016/0006864 A1 | 1/2016 | Park et al. | |
| 2016/0218916 A1* | 7/2016 | Labonte | H04L 41/0803 |
| 2016/0284279 A1* | 9/2016 | Li | G09G 3/3406 |

FOREIGN PATENT DOCUMENTS

| | | |
|---|---|---|
| KR | 1020130073430 | 7/2013 |
| KR | 101420704 | 8/2014 |
| KR | 1020140110706 | 9/2014 |
| KR | 1020150020997 | 2/2015 |
| KR | 1020150023257 | 3/2015 |
| WO | 2014088474 | 6/2014 |

* cited by examiner

DISPLAY DRIVER INTEGRATED CIRCUIT FOR CERTIFYING AN APPLICATION PROCESSOR AND A MOBILE APPARATUS HAVING THE SAME

CROSS-REFERENCE TO RELATED APPLICATION

This application claims priority under 35 U.S.C. § 119 to Korean Patent Application No. 10-2015-0101774 filed on Jul. 17, 2015, the disclosure of which is incorporated by reference herein in its entirety.

TECHNICAL FIELD

Exemplary embodiments of the inventive concept relate to a display driver integrated circuit, and more particularly, to a display driver integrated circuit for certifying an application processor and a mobile apparatus having the same.

DESCRIPTION OF RELATED ART

When a smart-phone is released, especially an expensive one, imitation phones are produced. These imitation phones may include a high-end display panel, but a low-end and/or counterfeit application processor. Accordingly, a manufacturer of the smart phone suffers a financial loss and damaged reputation due to an imitation phone.

SUMMARY

In accordance with an exemplary embodiment of the inventive concept, a display driver integrated circuit (DDI) may include a seed generation block configured to generate a seed, an encryption block configured to encrypt the seed and generate a first encryption text, and a comparison block configured to receive a second encryption text, in which the seed is encrypted, from an application processor (AP), compare the first encryption text with the second encryption text, and output a control signal based on the comparison result.

In an exemplary embodiment of the inventive concept, the seed generation block may generate the seed using a chip identification (ID) of the DDI.

In an exemplary embodiment of the inventive concept, the encryption block may use a public encryption algorithm, and the AP may generate the second encryption text using the public encryption algorithm.

In an exemplary embodiment of the inventive concept, the seed generation block may generate a random number when the DDI wakes up, and the seed generation block may provide the random number as the seed.

In an exemplary embodiment of the inventive concept, the DDI may output the control signal to normally drive a display panel when the first encryption text and the second encryption text are identical.

In an exemplary embodiment of the inventive concept, the DDI may output the control signal so as not to drive a display panel when the first encryption text and the second encryption text are different.

In an exemplary embodiment of the inventive concept, the DDI may cause a display panel to display only a predetermined image when the first encryption text and the second encryption text are different.

In an exemplary embodiment of the inventive concept, the seed generation block may transmit the seed to the AP through a mobile industry processor interface (MIPI), and the AP may transmit the second encryption text to the comparison block through the MIPI.

In accordance with an exemplary embodiment of the inventive concept, a mobile apparatus may include a display panel, a DDI configured to control the display panel, and an AP configured to transmit display data to the DDI and the AP may include a first shared key storage unit configured to store a first shared key, and a first encryption block configured to encrypt the first shared key and a random number and generate a first encryption text, and the DDI may include a second shared key storage unit configured to store a second shared key, a random number generator configured to generate the random number, a second encryption block configured to encrypt the second shared key and the random number and generate a second encryption text, and a comparison block configured to compare the first encryption text with the second encryption text and control the display panel based on the comparison result.

In an exemplary embodiment of the inventive concept, the first encryption block and the second encryption block may use the same public encryption algorithm.

In an exemplary embodiment of the inventive concept, the random number generator may include a true random number generator (TRNG), or a pseudo-random number generator (PRNG).

In an exemplary embodiment of the inventive concept, the DDI may normally drive the display panel when the first encryption text and the second encryption text are identical.

In an exemplary embodiment of the inventive concept, the DDI may not drive the display panel when the first encryption text and the second encryption text are different.

In an exemplary embodiment of the inventive concept, the DDI may control the display panel to display only a predetermined image when the first encryption text and the second encryption text are different.

In an exemplary embodiment of the inventive concept, the random number generator may transmit the random number to the second encryption block through a MIPI, and the second encryption block may transmit the second encryption text to the comparison block through the MIPI.

In an exemplary embodiment of the inventive concept, the first shared key and the second shared key may be identical.

In accordance with an exemplary embodiment of the inventive concept, an apparatus comprises: a display; a display driver; and a processor configured to transmit display data to the display driver, wherein the display driver is configured to generate a first encrypted signal, to receive a second encrypted signal from the application processor, to compare the first and second encrypted signals, and the control the display according a result of the comparison.

In an exemplary embodiment of the inventive concept, the first and second encrypted signals may be generated by using a unique identifier provided from the display driver.

In an exemplary embodiment of the inventive concept, the first and second encrypted signals may be generated by using a random number and a shared key.

In an exemplary embodiment of the inventive concept, when the first and second encrypted signals do not match, functionality of the display may be inhibited.

BRIEF DESCRIPTION OF THE DRAWINGS

The foregoing and other features of the inventive concept will become more apparent by describing in detail exemplary embodiments thereof with reference to the accompanying drawings. In the drawings.

DETAILED DESCRIPTION OF THE EMBODIMENTS

Exemplary embodiments of the inventive concept are described below more fully with reference to the accompanying drawings. It is to be understood that the inventive concept may be embodied in many alternate forms and should not be construed as limited to the exemplary embodiments set forth herein.

It will be understood that when an element is referred to as being "connected" or "coupled" to another element, it can be directly connected or coupled to the other element or intervening elements may be present.

Figure 1:
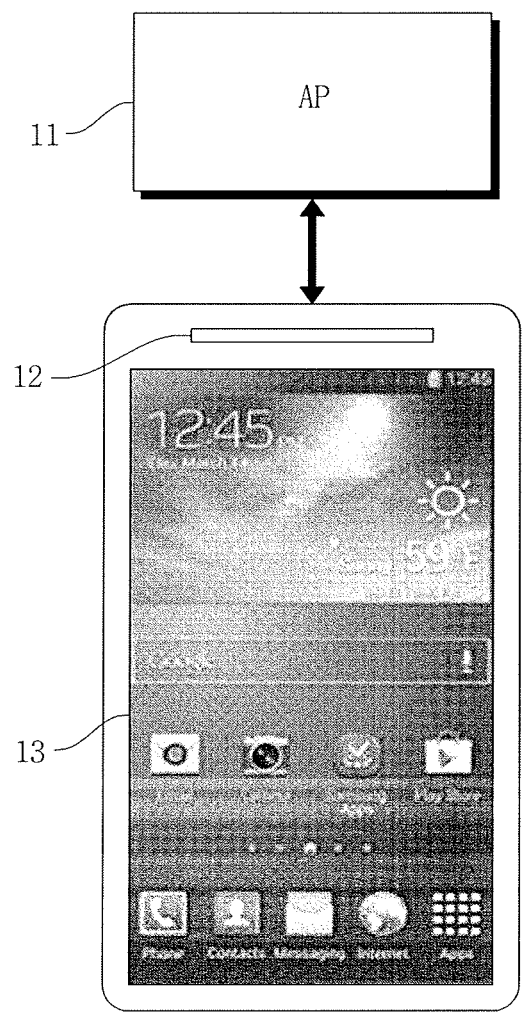
FIG. 1 is a block diagram illustrating a mobile apparatus according to a related art.

The articles "a", "an", and "the" are singular in that they have a single referent, however the use of the singular form in the present document should not preclude the presence of more than one referent. In other words, elements of the invention referred to as in singular may number one or more, unless the context clearly indicates otherwise. FIG. 1 is a block diagram illustrating a mobile apparatus according to a related art. Referring to FIG. 1, a mobile apparatus 10 according to the related art may include an application processor (AP) 11, a display driver integrated circuit (DDI) 12, and a display panel 13.

The AP 11 and the DDI 12 may be connected without a genuine product certification procedure. Accordingly, even though one of the AP 11 and the DDI 12 is an imitation (e.g., counterfeit) component, the mobile apparatus 10 may normally operate. For example, the AP 11 may transmit display data to the DDI 12. The DDI 12 may control the display panel 13 to display the display data.

Generally, a manufacturer of an imitation phone may manufacture the imitation phone with an expensive display panel like that used in the phone being copied and a fake (e.g., counterfeit) AP. The fake AP is cheaper than the AP used in the phone being copied. Because the mobile apparatus 10 according to the related art does not include a genuine product certification procedure, the DDI 12 may receive display data from the fake AP 11.

Figure 2:
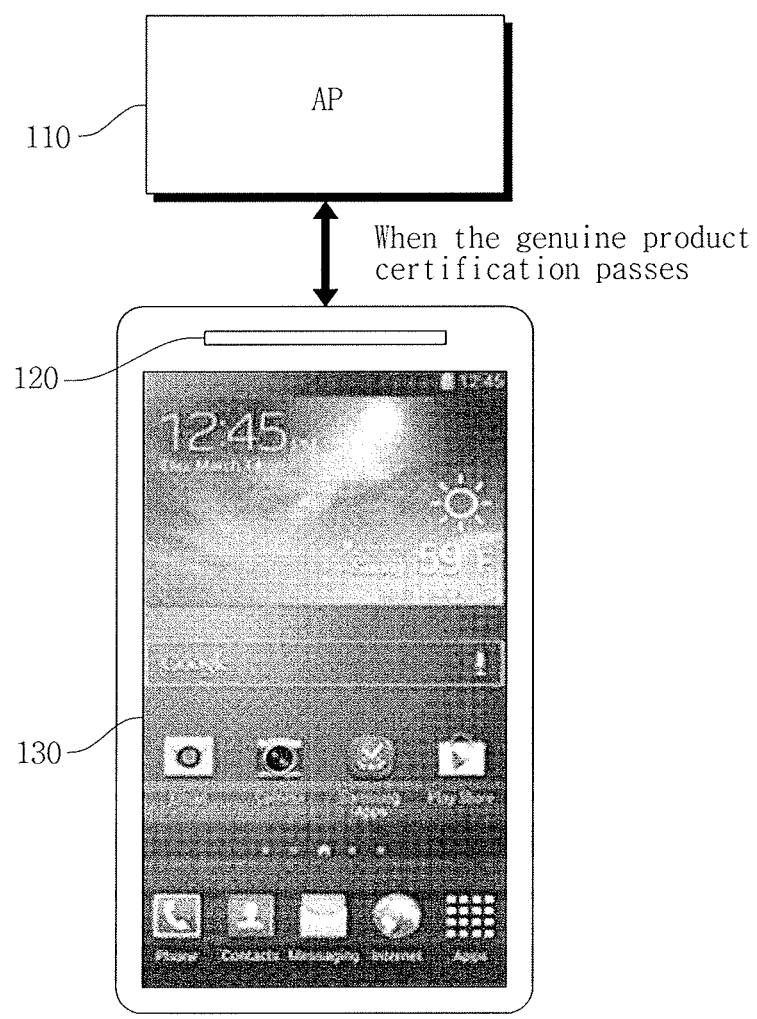
FIG. 2 is a block diagram illustrating a mobile apparatus according to an exemplary embodiment of the inventive concept.

FIG. 2 is a block diagram illustrating a mobile apparatus according to an exemplary embodiment of the inventive concept. Referring to FIG. 2, a mobile apparatus 100 according to the present embodiment of the inventive concept may include an AP 110, a DDI 120, and a display panel 130.

The AP 110 and the DDI 120 may be connected through a genuine product certification procedure. In other words, when one of the AP 110 and the DDI 120 is an imitation component, the mobile apparatus 100 may abnormally operate. For example, the AP 110 may transmit display data to the DDI 120. When the genuine product certification procedure is complete, and both the AP 110 and the DDI 120 are certified as genuine, the DDI 120 may control the display panel 130 to display the display data.

Figure 3:
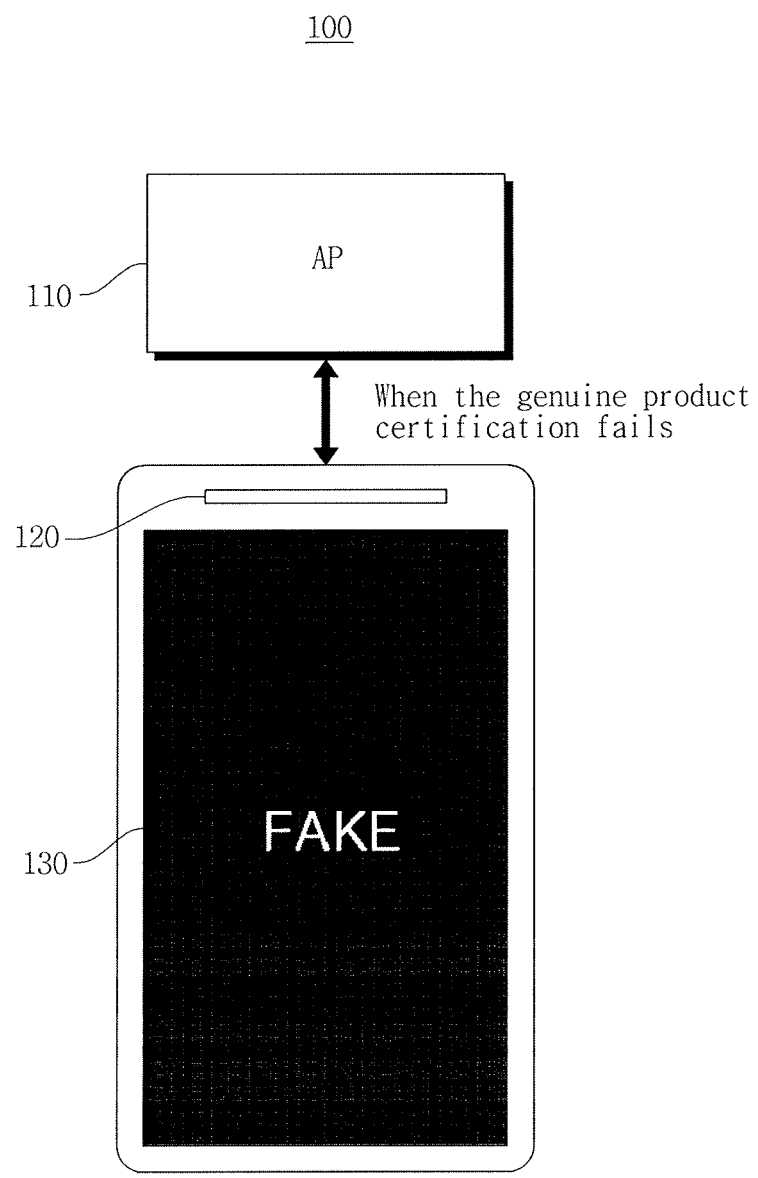
FIG. 3 illustrates a view of a screen being displayed on the mobile apparatus shown in FIG. 2 when a genuine product certification procedure fails.

FIG. 3 illustrates a view of a screen being displayed on the mobile apparatus shown in FIG. 2 when a genuine product certification procedure fails. Referring to FIGS. 2 and 3, when a genuine product certification procedure fails, the DDI 120 may control the display panel 130 to display a text of "FAKE" on the display panel 130. Moreover, the DDI 120 may control the display panel 130 to display a background screen of all black on the display panel 130. It is to be understood that other disabling text and/or features may be implemented by the DDI 120 when the certification procedure fails.

When the mobile apparatus 100 according to the present embodiment of the inventive concept includes a genuine product certification procedure, if the AP 110 is a counterfeit, the DDI 120 may not transmit display data received from the AP 110 to the display panel 130.

Exemplary embodiments of the inventive concept for certifying the AP 110 may encrypt a seed to certify the AP 110. These embodiments may be described with reference to FIG. 4.

Moreover, exemplary embodiments of the inventive concept for certifying the AP 110 may encrypt a random number and a public key to certify the AP 110. These embodiments may be described with reference to FIG. 7.

Furthermore, exemplary embodiments of the inventive concept for certifying the AP 110 may encrypt a random number, a public key and a private key to certify the AP 110. These embodiments may be described with reference to FIG. 8.

Figure 4:
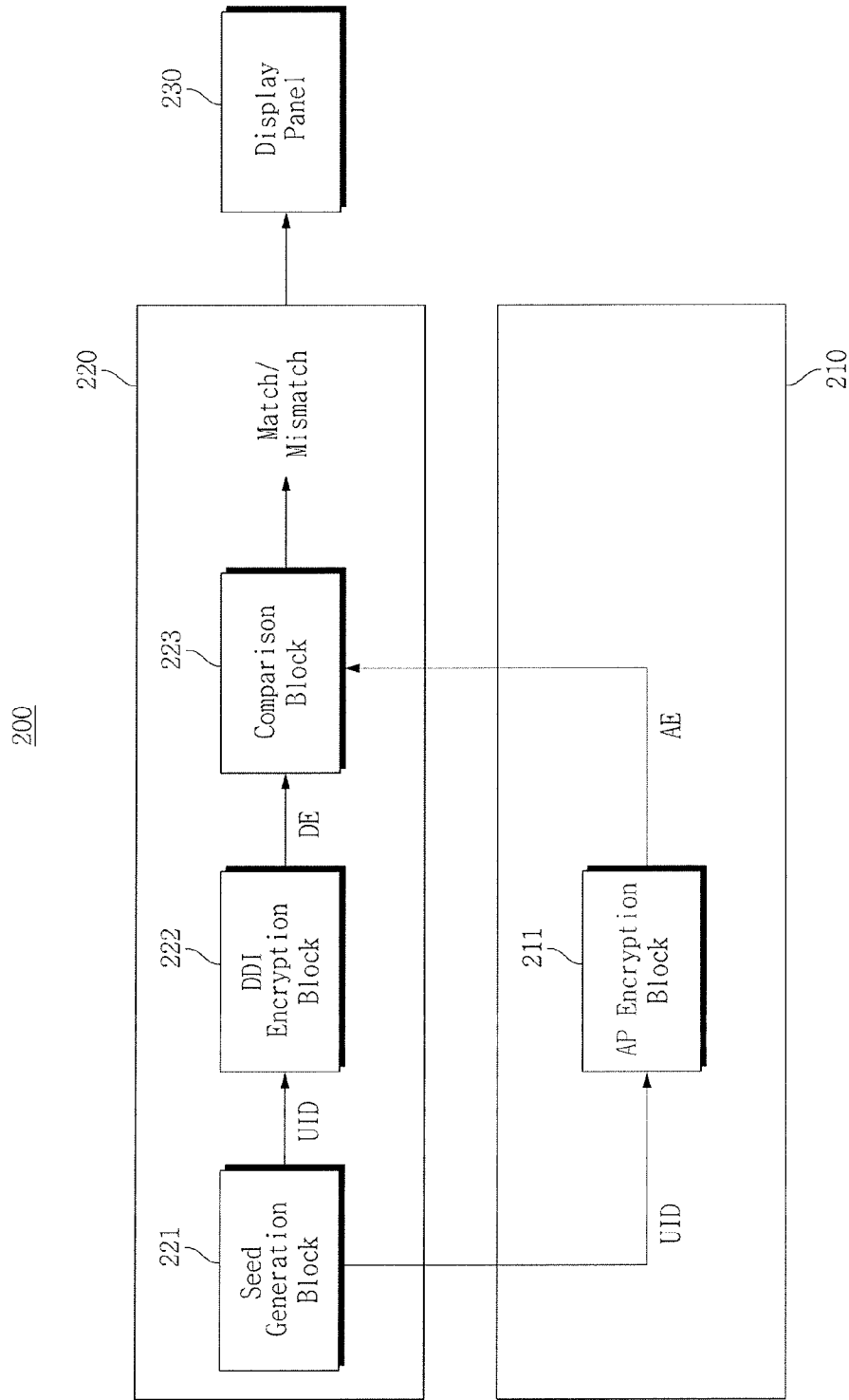
FIG. 4 is a block diagram illustrating a mobile apparatus according to an exemplary embodiment of the inventive concept.

FIG. 4 is a block diagram illustrating a mobile apparatus according to an exemplary embodiment of the inventive concept. Referring to FIG. 4, a mobile apparatus 200 according to the present embodiment of the inventive concept may include an AP 210, a DDI 220, and a display panel 230.

The AP 210 may include an AP encryption block 211. In an exemplary embodiment of the inventive concept, the AP encryption block 211 may be implemented by hardware or software.

For example, the AP 210 may implement the AP encryption block 211 by software in a boot loader in which operating codes are hidden.

The AP encryption block 211 may be implemented by hardware for high-level security. Moreover, the AP 210 may implement a function of the AP encryption block 211 using a security block embedded in the AP 210.

Moreover, the DDI 220 may include a seed generation block 221, a DDI encryption block 222, and a comparison block 223.

The DDI 220 may store unique chip identification (ID). The seed generation block 221 may use the chip ID of the DDI 220 as a unique ID (UID). Moreover, the seed generation block 221 may use a fusing value owned by the DDI 220 as the UID. The UID may be used as a seed for executing an encryption algorithm.

Moreover, whenever the DDI 220 wakes up, the seed generation block 221 may further include a random number generation block for generating a random number. The seed generation block 221 may use the random number generated by the random number generation block as the UID. In an exemplary embodiment of the inventive concept, the seed generation block 221 may be implemented by hardware in the DDI 220.

The DDI encryption block 222 may encrypt the UID. The DDI encryption block 222 may encrypt the UID to generate a DDI encryption text DE. The DDI encryption block 222 may transmit the DDI encryption text DE to the comparison block 223.

The DDI encryption block 222 may be implemented by an algorithm signed between an AP manufacturer and a DDI manufacturer. In an exemplary embodiment of the inventive concept, the algorithm signed between the AP manufacturer and the DDI manufacturer may include a public encryption algorithm.

Moreover, although the DDI encryption block 222 uses the public encryption algorithm, whenever the DDI 220 wakes up, the DDI 220 may increase a security level through a certification method which encrypts a random seed every time. In an exemplary embodiment of the inventive concept, the DDI encryption block 222 may be implemented by hardware in the DDI 220.

The AP 210 may receive the UID from the seed generation block 221. The AP encryption block 211 may encrypt the UID and may generate an AP encryption text AE. The AP encryption block 211 may transmit the AP encryption text AE to the comparison block 223.

In an exemplary embodiment of the inventive concept, the seed generation block 221 may transmit the UID to the AP encryption block 211 through a mobile industry processor interface (MIPI). The AP encryption block 211 may transmit the AP encryption text AE to the comparison block 223 through the MIPI.

The comparison block 223 may receive the DDI encryption text DE and the AP encryption text AE. Moreover, the comparison block 223 may compare the DDI encryption text DE with the AP encryption text AE. When the DDI encryption text DE is equal to (e.g., matches) the AP encryption text AE, the genuine product certification procedure passes. When the DDI encryption text DE is different from (e.g., does not match) the AP encryption text AE, the genuine product certification procedure fails.

The comparison block 223 may control an operation of the display panel 230 based on the comparison result. For example, when the comparison result is a pass, the DDI 220 may normally operate the display panel 230. However, when the comparison result is a fail, the DDI 220 may control the display panel 230 to stop an operation or to output only a specific image. In an exemplary embodiment of the inventive concept, the comparison block 223 may be implemented by hardware in the DDI 220.

The mobile apparatus 200 according to the present embodiment of the inventive concept may include a communication chip, a camera module, a sensor, a battery, and/or the like, as well as the AP 210, the DDI 220, and display panel 230.

In this case, when the AP 210 is certified, the AP 210 may certify at least one of a communication chip, a camera module, a sensor, and a battery using the same genuine product certification procedure.

In an exemplary embodiment of the inventive concept, the DDI 220 according to the present embodiment of the inventive concept may perform a genuine product certification procedure during a wake-up interval. Accordingly, booting time of the mobile apparatus 200 may not be affected by the genuine product certification procedure.

Figure 5:
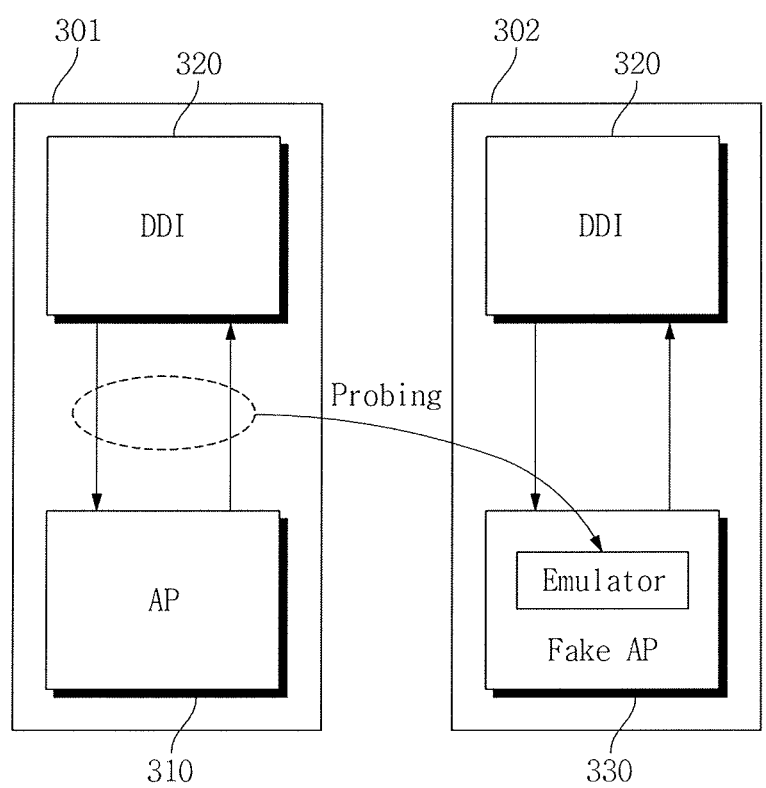
FIG. 5 is a block diagram for describing a first attack with respect to the mobile apparatus shown in FIG. 4.

FIG. 5 is a block diagram for describing a first attack with respect to the mobile apparatus shown in FIG. 4. Referring to FIGS. 4 and 5, a first mobile apparatus 301 may include a genuine AP 310 and a DDI 320. Here, the genuine AP 310 and DDI 320 may be genuine products.

The genuine AP 310 may transmit display data to the DDI 320 through a MIPI. Here, a manufacturer of an imitation phone may probe data lines between the genuine AP 310 and the DDI 320.

Through the probing operation, the manufacturer of the imitation phone may extract a seed from the DDI 320. Moreover, the manufacturer of the imitation phone may extract an output value, in which the seed is encrypted, from the genuine AP 310.

The manufacturer of the imitation phone may manufacture a second mobile apparatus 302 which is the imitation phone using a fake AP 330 and the DDI 320.

The fake AP 330 may include an emulator. The emulator may receive a seed from the DDI 320 which is a genuine product. The emulator may encrypt the seed and transmit the encrypted seed to the DDI 320. Accordingly, the second mobile apparatus 302 may perform the genuine product certification procedure.

Because the DDI 320 according to the present embodiment of the inventive concept uses a seed which is a fixed value, the hack may succeed.

Figure 6:
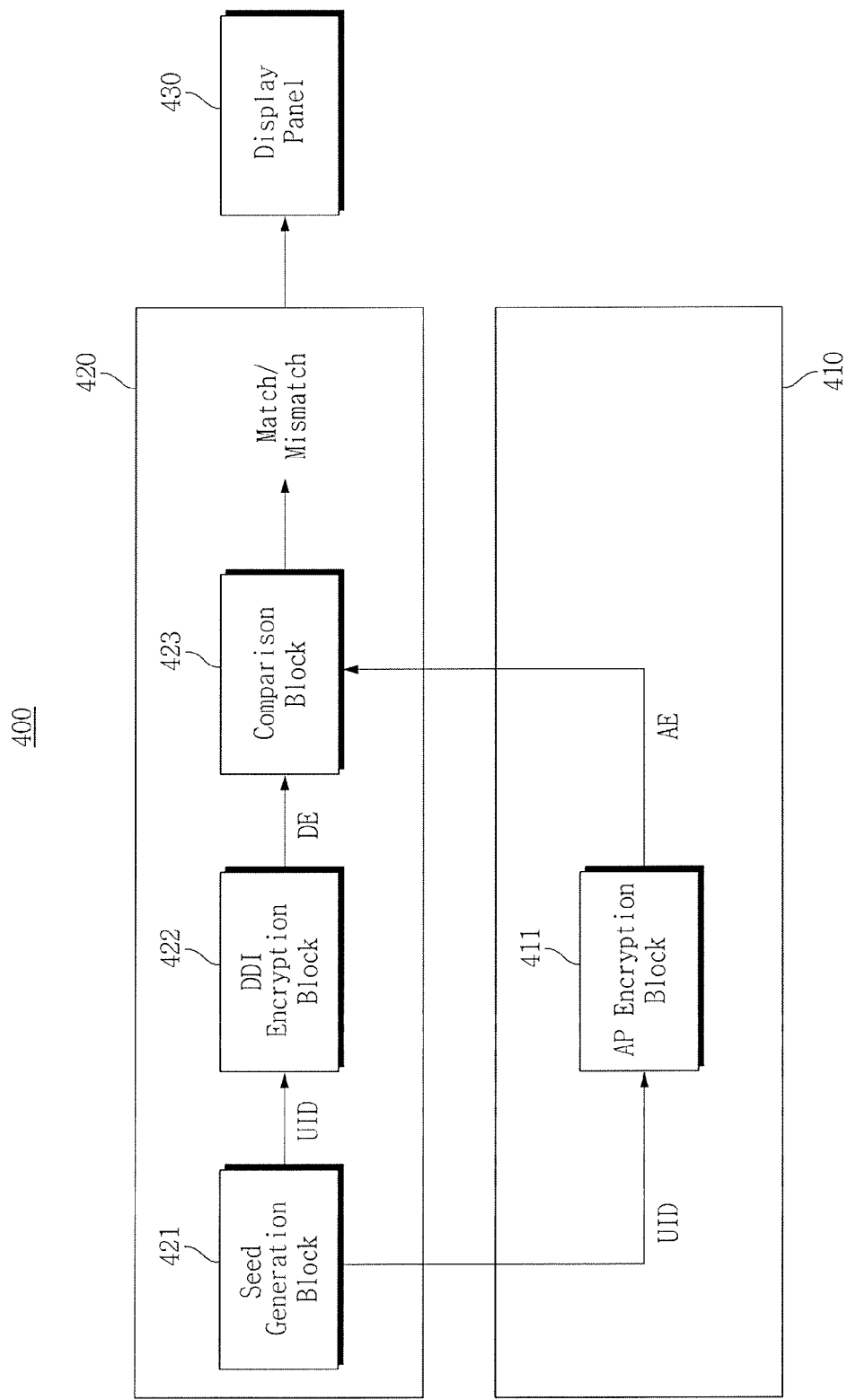
FIG. 6 is a block diagram for describing a second attack with respect to the mobile apparatus shown in FIG. 4.

FIG. 6 is a block diagram for describing a second attack with respect to the mobile apparatus shown in FIG. 4. Referring to FIGS. 4 and 6, a mobile apparatus 400 according to an exemplary embodiment of the inventive concept may include an AP 410, a DDI 420, and a display panel 430.

The AP 410 may include an AP encryption block 411. Moreover, the DDI 420 may include a seed generation block 421, a DDI encryption block 422, and a comparison block 423.

The mobile apparatus 400 according to the present embodiment of the inventive concept may include the same configuration as the mobile apparatus 200 illustrated in FIG. 2. Accordingly, the AP encryption block 411 and the DDI encryption block 422 may use the same encryption algorithm. Furthermore, the seed generation block 421 and the comparison block 423 may function similar to or the same as the seed generation block 221 and the comparison block 223.

Generally, the AP 410 may be a product manufactured by one of various AP manufacturers. In this case, an encryption algorithm may be leaked by one of the AP manufacturers. Accordingly, the genuine product certification procedure may be easily hacked.

Figure 7:
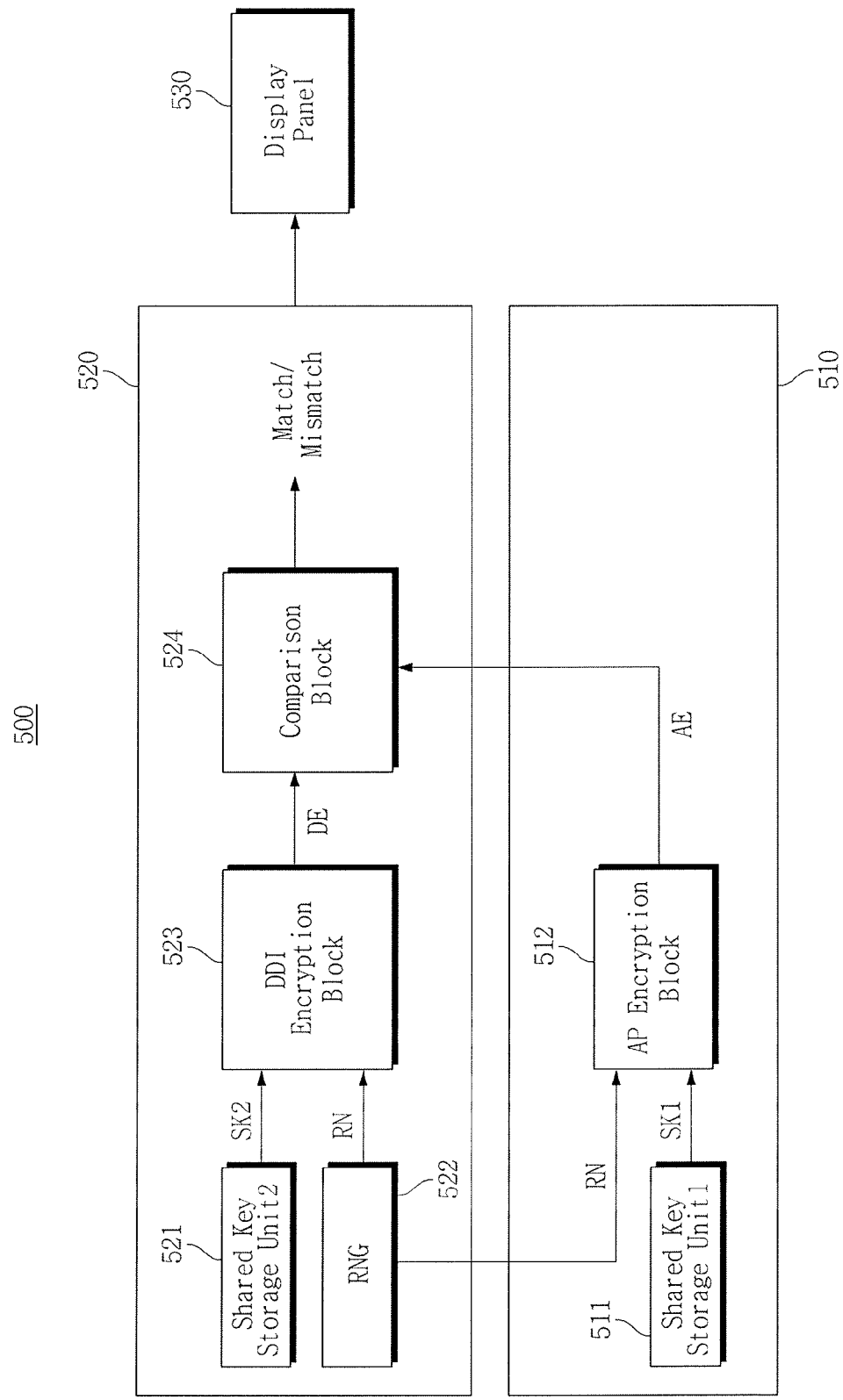
FIG. 7 is a block diagram illustrating a mobile apparatus according to an exemplary embodiment of the inventive concept.

FIG. 7 is a block diagram illustrating a mobile apparatus according to an exemplary embodiment of the inventive concept. A mobile apparatus 500 according to the present embodiment of the inventive concept may prevent the hacks described in FIGS. 5 and 6. For example, the mobile apparatus 500 may encrypt a shared key and a random number and may certify an AP.

Referring to FIG. 7, the mobile apparatus 500 according to the present embodiment of the inventive concept may include an AP 510, a DDI 520, and a display panel 530.

The AP 510 may include a first shared key storage unit 511 and an AP encryption block 512. The first shared key storage unit 511 may store a first shared key SK1. In an exemplary embodiment of the inventive concept, the AP encryption block 512 may be implemented by hardware or software.

For example, the AP 510 may implement the AP encryption block 512 by software in a boot loader in which operating codes are hidden.

The AP encryption block 512 may be implemented by hardware for high-level security. Moreover, the AP 510 may implement a function of the AP encryption block 512 using a security block embedded in the AP 510.

Moreover, the DDI 520 may include a second shared key storage unit 521, a random number generator 522, a DDI encryption block 523, and a comparison block 524.

The second shared key storage unit 521 may store a second shared key SK2. In an exemplary embodiment of the inventive concept, the first shared key SK1 and the second shared key SK2 may be identical. The first shared key storage unit 511 may be a one-time programmable (OTP) memory in the DDI 520. The second shared key storage unit 521 may be an OTP memory in the AP 510. In an exemplary embodiment of the inventive concept, each of the first shared key SK1 and the second shared key SK2 may be implemented as 256 bits.

The random number generator 522 may generate a random number RN. In an exemplary embodiment of the inventive concept, the random number generator 522 may be implemented by hardware in the DDI 520. In an exemplary embodiment of the inventive concept, the random number generator 522 may include one of a true random number generator (TRNG) and a pseudo-random number generator (PRNG). The TRNG may generate the random number RN using a temperature parameter. Accordingly, the TRNG may generate the random numbers RN which are always different from each other. In addition, the PRNG may generate the random number RN using a random number generation algorithm. Accordingly, the PRNG may generate the random number RN, which is varied according to a seed. The random number generator 522 may transmit the random number RN to the AP encryption block 512 and the DDI encryption block 523.

Moreover, the random number generator 522 may generate the random number RN, whenever the DDI 520 wakes up.

The AP encryption block 512 may receive the first shared key SK1 and the random number RN. The AP encryption block 512 may generate an AP encryption text AE using the first shared key SK1 and the random number RN. The AP encryption block 512 may transmit the AP encryption text AE to the comparison block 524.

The DDI encryption block 523 may receive the second shared key SK2 and the random number RN. The DDI encryption block 523 may generate a DDI encryption text DE using the second shared key SK2 and the random number RN. The DDI encryption block 523 may transmit the DDI encryption text DE to the comparison block 524.

In an exemplary embodiment of the inventive concept, each of the AP encryption block 512 and the DDI encryption block 523 may include a public key encryption algorithm.

The comparison block 524 may receive the DDI encryption text DE and the AP encryption text AE. The comparison block 524 may compare the DDI encryption text DE with the AP encryption text AE. When the DDI encryption text DE and AP encryption text AE are identical, the genuine product certification procedure may be passed. When the DDI encryption text DE and AP encryption text AE are different, the genuine product certification procedure may be failed.

The comparison block 524 may control an operation of the display panel 530 based on the comparison result. For example, when the comparison result is a pass, the DDI 520 may normally operate the display panel 530. However, when the comparison result is a fail, the DDI 520 may control the display panel 530 to stop an operation or to output only a specific image.

The random number generator 522 may transmit the random number RN to the AP encryption block 512 through a MIPI, and the AP encryption block 512 may transmit the AP encryption text AE to the comparison block 524 through the MIPI.

The mobile apparatus 500 according to the present embodiment of the inventive concept may include a communication chip, a camera module, a sensor, a battery, and/or the like as well as the AP 510, the DDI 520, and the display panel 530.

In this case, when the DDI 520 certifies the AP 510, the AP 510 may certify one of a communication chip, a camera module, a sensor, and a battery using the same method.

The DDI 520 according to the present embodiment of the inventive concept may perform a genuine product certification procedure during a wake-up interval. Accordingly, the genuine product certification procedure does not influence booting time of the mobile apparatus 500.

In accordance with an exemplary embodiment of the inventive concept, a communication method is not limited to the MIPI. For example, the MIPI may be replaced by an inter-integrated circuit (I2C), a serial peripheral interface (SPI), or the like.

Figure 8:
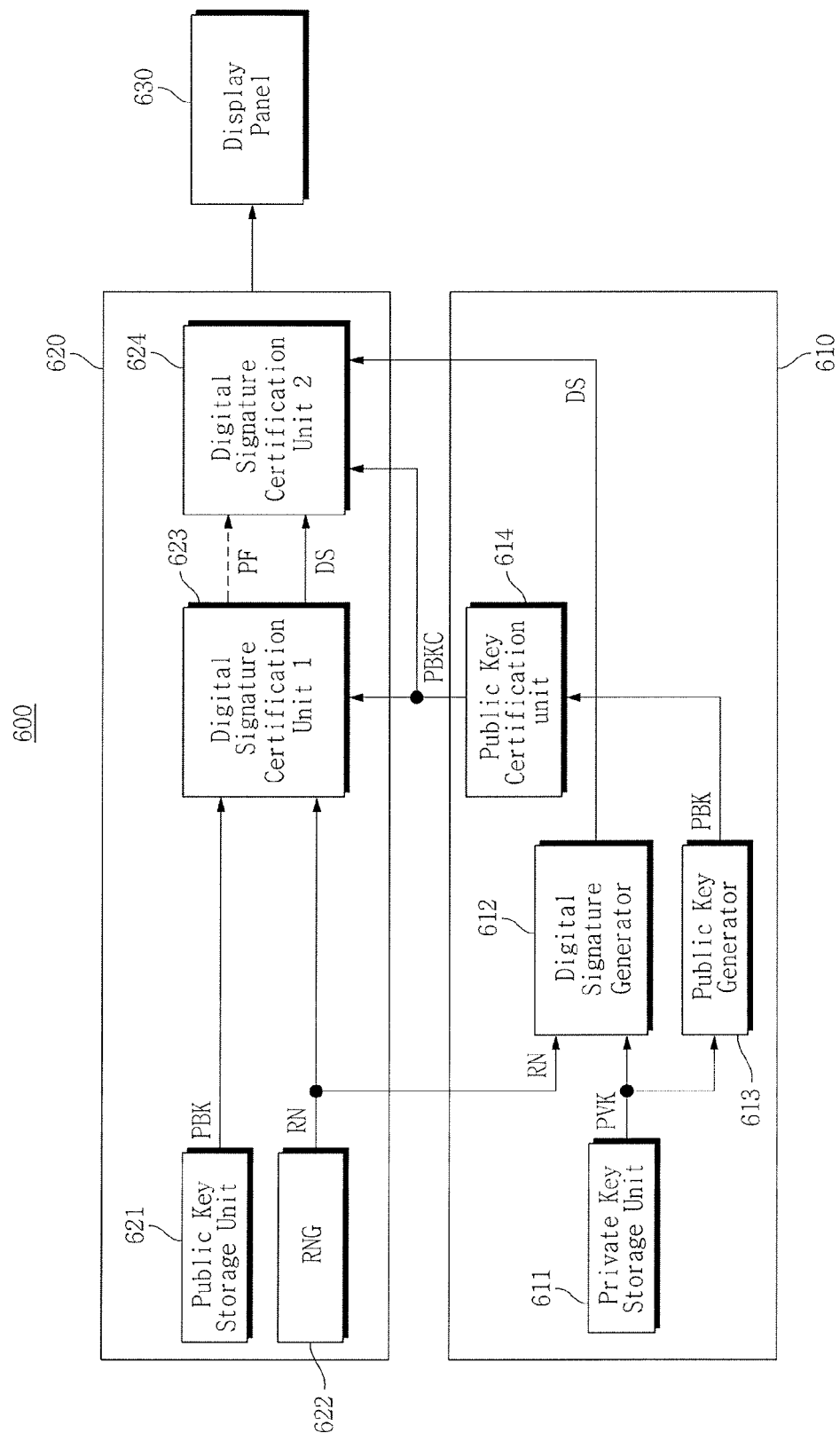
FIG. 8 is a block diagram illustrating a mobile apparatus according to an exemplary embodiment of the inventive concept.

FIG. 8 is a block diagram illustrating a mobile apparatus according to an exemplary embodiment of the inventive concept. A mobile apparatus 600 according to the present embodiment of the inventive concept may prevent the hacks described in FIGS. 5 and 6. For example, the mobile apparatus 500 may encrypt a private key, a public key, and a random number and may certify an AP.

Referring to FIG. 8, the mobile apparatus 600 according to the present embodiment of the inventive concept may include an AP 610, a DDI 620, and a display panel 630.

The AP 610 may include a private key storage unit 611, a digital signature generator 612, a public key generator 613, and a public key certification unit 614.

The private key storage unit 611 may store a private key PVK. The digital signature generator 612 may be implemented by hardware or software. For example, the AP 610 may implement the digital signature generator 612 by software in a boot loader in which operating codes are hidden. The digital signature generator 612 may be implemented by hardware for high-level security.

The public key generator 613 may generate a public key PBK using the private key PVK. The public key generator 613 may be implemented by hardware.

The digital signature generator 612 may receive the private key PVK and a random number RN. The digital signature generator 612 may generate a digital signature DS using the private key PVK and the random number RN. The digital signature generator 612 may transmit the digital signature DS to a second digital signature certification unit 624.

The public key certification unit 614 may receive the public key PBK. Moreover, the public key certification unit 614 may certify the public key PBK and may generate a public key certificate PBKC. The public key certification unit 614 may be implemented by hardware.

The DDI 620 may include a public key storage unit 621, a random number generator 622, a first digital signature certification unit 623, and the second digital signature certification unit 624.

The public key storage unit 621 may store the public key PBK. In an exemplary embodiment of the inventive concept, the public key storage unit 621 may be an OTP memory in the DDI 620. The private key storage unit 611 may be an OTP memory in the AP 610. In an exemplary embodiment of the inventive concept, each of the private key PVK and the public key PBK may be implemented as 256 bits.

The random number generator 622 may generate the random number RN. In an exemplary embodiment of the inventive concept, the random number generator 622 may include one of a TRNG and a PRNG. The random number generator 622 may transmit the random number RN to the digital signature generator 612 and the first digital signature certification unit 623.

In an exemplary embodiment of the inventive concept, the random number generator 622 may generate the random number RN whenever the DDI 620 wakes up.

Moreover, the random number generator 622 may transmit the random number RN to the digital signature generator 612 through a MIPI, and the digital signature generator 612 may transmit the public key certificate PBKC to the second digital signature certification unit 624 through the MIPI.

The first digital signature certification unit 623 may receive the public key PBK, the random number RN, and the public key certificate PBKC. In an exemplary embodiment of the inventive concept, each of the digital signature generator 612, the first digital signature certification unit 623, and the second digital signature certification unit 624 may be implemented by a digital signature algorithm. The digital signature algorithm may include an elliptic curve digital signature algorithm (ECDSA). In addition, the first digital signature certification unit 623, and the second digital signature certification unit 624 may be implemented by hardware.

The first digital signature certification unit 623 may certify the public key certificate PBKC and may transmit a pass/fail signal PF to the second digital signature certification unit 624. Moreover, the first digital signature certification unit 623 may generate the digital signature DS and may transmit the digital signature DS to the second digital signature certification unit 624.

For example, when the public key certificate PBKC is certified, the pass/fail signal PF may be in a high state. However, when the public key certificate PBKC is not certified, the pass/fail signal PF may be in a low state.

When the pass/fail signal PF is in the high state, the second digital signature certification unit 624 may certify the digital signature DS. In other words, when the public key certificate PBKC is certified, the second digital signature certification unit 624 may certify the digital signature DS.

The second digital signature certification unit 624 may receive the pass/fail signal PF, and the digital signature DS from the DDI 620, and the public key certificate PBKC and the digital signature DS from the AP 610.

When the pass/fail signal PF is in the high state, the second digital signature certification unit 624 may certify the digital signature DS using the random number RN and the public key certificate PB KC. For example, when the digital signature DS from the DDI 620 and the digital signature DS from the AP 610 are identical, the digital signature DS may be certified.

When the digital signature DS is certified, the genuine product certification procedure with respect to the AP 610 may be passed. When the digital signature DS is not certified, the genuine product certification procedure may be failed.

The second digital signature certification unit 624 may control an operation of the display panel 630 based on the certification result of the digital signature DS. For example, when the digital signature DS is certified, the DDI 620 may normally drive the display panel 630. However, when the digital signature DS is not certified, the DDI 620 may control the display panel 630 to stop an operation or to output only a specific image.

The mobile apparatus 600 according to the present embodiment of the inventive concept may include a communication chip, a camera module, a sensor, a battery, and/or the like as well as the AP 610, the DDI 620, and display panel 630.

In this case, when the DDI 620 certifies the AP 610, the AP 610 may certify at least one of a communication chip, a camera module, a sensor, and a battery using the same genuine product certification procedure Whenever the DDI 620 according to the present embodiment of the inventive concept wakes up, the DDI 620 may perform a genuine product certification procedure. Accordingly, a booting time of the mobile apparatus 600 may not be affected by the genuine product certification procedure.

A manufacturer of an AP may manage a private key, and a manufacturer of a DDI may have a public key corresponding to a private key. Accordingly, the manufacturer of the DDI may determine whether an AP is a genuine product using a public key.

Figure 9:
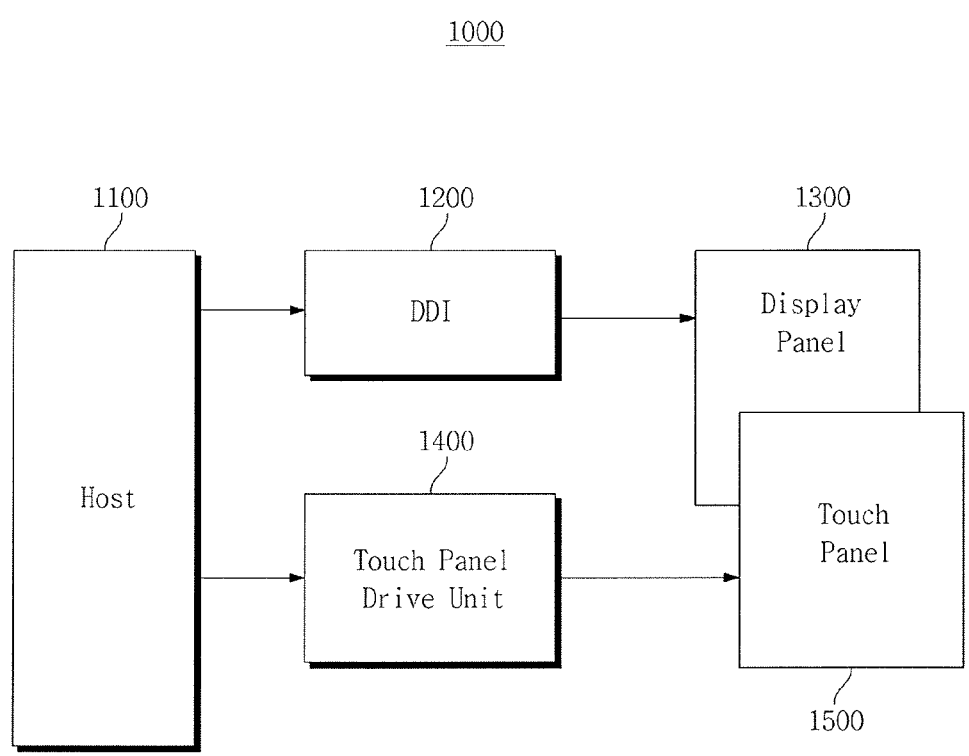
FIG. 9 is a block diagram illustrating a user system including a display driver integrated circuit (DDI) according to an exemplary embodiment of the inventive concept.

FIG. 9 is a block diagram illustrating a user system including the DDI according to an exemplary embodiment of the inventive concept. Referring to FIG. 9, the user system 1000 may include a host 1100, a DDI 1200, a display panel 1300, a touch panel drive unit 1400, and a touch panel 1500.

The host 1100 may receive data or a command from a user and control the DDI 1200 and the touch panel drive unit 1400 based on the data or command. The DDI 1200 may drive the display panel 1300 according to the control of the host 1100. In an exemplary embodiment of the inventive concept, the DDI 1200 may include the DDI 120 shown in FIG. 2.

The touch panel 1500 may be provided to overlap the display panel 1300. The touch panel drive unit 1400 may receive data sensed from the touch panel 1500 and transmit the sensed data to the host 1100.

Figure 10:
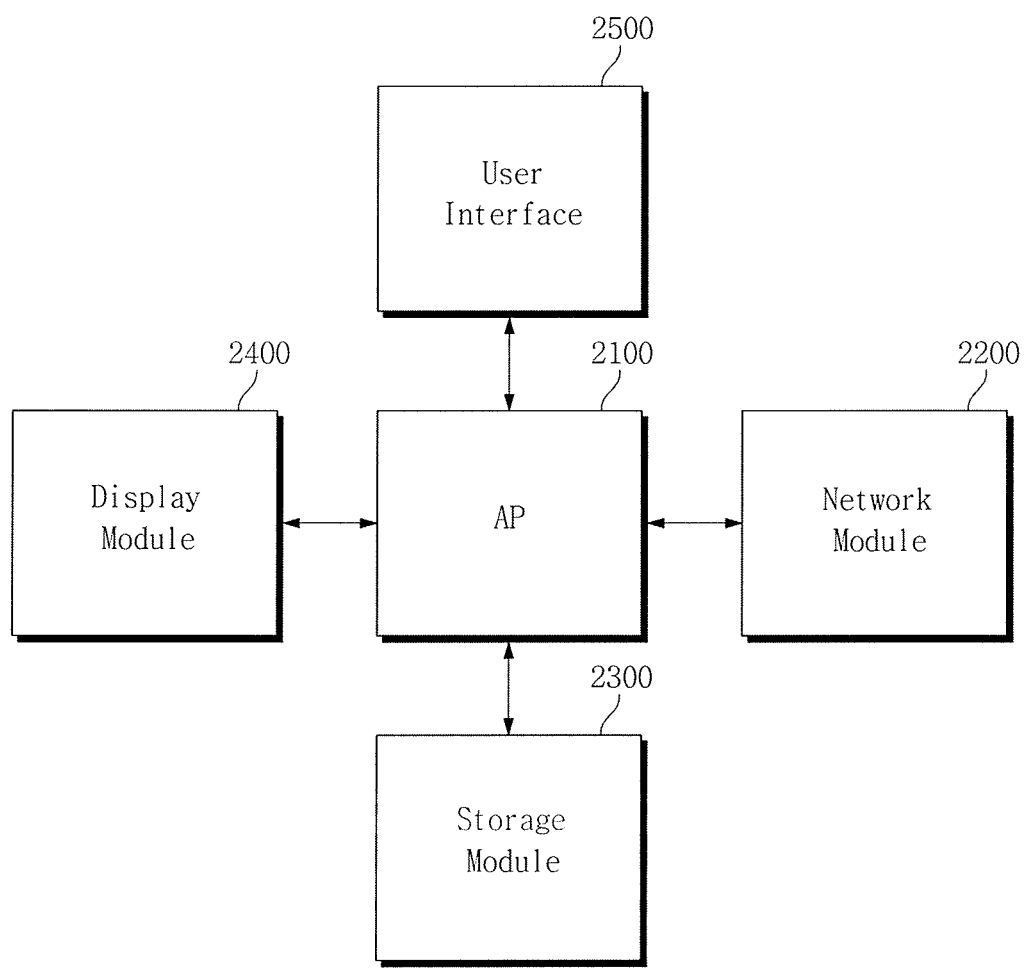
FIG. 10 is a block diagram illustrating a mobile system including a DDI according to an exemplary embodiment of the inventive concept.

FIG. 10 is a block diagram illustrating a mobile system including the DDI according to an exemplary embodiment of the inventive concept. Referring to FIG. 10, the mobile system 2000 may include an AP 2100, a network module 2200, a storage module 2300, a display module 2400, and a user interface 2500.

For example, the mobile system 2000 may be provided with one of computing systems such as an ultra-mobile personal computer (UMPC), a work-station, a net-book, a personal digital assistant (PDA), a portable computer, a web tablet, a wireless phone, a mobile phone, a smart phone, an e-book, a portable multimedia player (PMP), portable game machine, a navigation device, a black box, a digital camera, a digital multimedia broadcasting (DMB) player, a digital audio recorder, a digital audio player, a digital picture player, a digital video recorder, a digital video player, etc.

The AP 2100 may operate components included in the mobile system 2000, an operating system (OS), etc. For example, the AP 2100 may include a graphic engine, controllers which control the components included in the mobile system 2000, and interfaces.

The network module 2200 may communicate with external devices. The network module 2200 may support a wireless communication such as a code division multiple access (CDMA), a global system for mobile communication (GSM), a wideband code division multiple access (WCDMA), a CDMA-2000, a time division multiple access (TDMA), a long term evolution (LTE), a worldwide interoperability for microwave access (WiMax), a wireless local area network (WLAN), an ultra-wide band (UWB), a Bluetooth, a wireless display (WI-DI), etc.

The storage module 2300 may store data. For example, the storage module 2300 may store data received from an external device. Moreover, the storage module 2300 may transmit the data stored in the storage module 2300 to the AP 2100. In an exemplary embodiment of the inventive concept, the storage module 2300 may include a dynamic random access memory (DRAM), a synchronous DRAM (SDRAM), a static RAM (SRAM), a double date rate SDRAM (DDR DRAM), a DDR2 SDRAM, a DDR3 SDRAM, a phase-change RAM (PRAM), a magnetic RAM (MRAM), a Resistive RAM (RRAM), a NAND flash memory, and a NOR flash memory.

The display module 2400 may output picture data according to a control of the AP 2100. For example, the display module 2400 and the AP 2100 may communicate based on a display serial interface (DSI). In an exemplary embodiment of the inventive concept, the display module 2400 may include the DDI 220 shown in FIG. 4.

The user interface 2500 may supply an interface, which inputs data or a command to the mobile system 2000 or outputs results from the mobile system 2000 based on the inputted data or the inputted command. In an exemplary embodiment of the inventive concept, the user interface 2500 may include input devices, such as a camera device, a touch screen, a motion recognition module, and a microphone, and output devices such as a display panel and a speaker.

The DDI according to an exemplary embodiment of the inventive concept may certify an AP. Accordingly, the DDI according to an exemplary embodiment of the inventive concept may distinguish an imitation phone using a fake AP.

Exemplary embodiments of the inventive concept may be applied to a DDI and a mobile apparatus having the same.

While the inventive concept has been described with reference to exemplary embodiments thereof, it will be understood by those skilled in the art that various changes and modifications may be made thereto without departing from the spirit and scope of the present inventive concept as defined by the appended claims.

What is claimed is:

1. An apparatus for performing a genuine product certification procedure, comprising:
a display panel;
a first shared key storage unit disposed in an application processor and configured to store a first shared key;
a second shared key storage unit disposed in a display driver integrated circuit and configured to store a second shared key;
a random number generator disposed in the display driver integrated circuit and configured to generate a random number;
a first encryption block disposed in the application processor and configured to generate a first encryption text using the random number and the first shared key;
a second encryption block disposed in the display driver integrated circuit and configured to generate a second encryption text using the random number and the second shared key; and
a comparison block configured to receive the second encryption text from the second encryption block, to receive the first encryption text from the first encryption block, to compare the first encryption text with the second encryption text, and to output a control signal based on the comparison result, wherein when the first encryption text and the second encryption text are identical the genuine product certification procedure is passed indicating that the application processor is not a counterfeit and when the first encryption text and the second encryption text are different the genuine product certification procedure is failed.

2. The apparatus of claim 1, wherein the display driver integrated circuit outputs the control signal to normally drive the display panel when the first encryption text and the second encryption text are identical.

3. The apparatus of claim 1, wherein the display driver integrated circuit outputs the control signal so as not to drive the display panel, when the first encryption text and the second encryption text are different.

4. The apparatus of claim 1, wherein the display driver integrated circuit causes the display panel to display only a predetermined image when the first encryption text and the second encryption text are different.

5. The apparatus of claim 1, wherein the random number generator transmits the random number to the application processor through a mobile industry processor interface (MIPI), and the application processor transmits the first encryption text to the comparison block through the MIPI.

6. A mobile apparatus for performing a genuine product certification procedure, comprising:
a display panel;
a display driver integrated circuit configured to control the display panel; and
an application processor configured to transmit display data to the display driver integrated circuit,
wherein the application processor comprises:
a first shared key storage unit configured to store a first shared key; and
a first encryption block configured to encrypt the first shared key and a random number and to generate a first encryption text, and
wherein the display driver integrated circuit comprises:
a second shared key storage unit configured to store a second shared key;
a random number generator configured to generate the random number;
a second encryption block configured to encrypt the second shared key and the random number and to generate a second encryption text; and
a comparison block configured to compare the first encryption text with the second encryption text and to control the display panel based on the comparison result, wherein when the first encryption text and the second encryption text are identical the genuine product certification procedure is passed indicating that the application processor is not a counterfeit and when the first encryption text and the second encryption text are different the genuine product certification procedure is failed.

7. The mobile apparatus of claim 6, wherein the first encryption block and the second encryption block use the same public encryption algorithm.

8. The mobile apparatus of claim 6, wherein the random number generator comprises a true random number generator (TRNG) or a pseudo-random number generator (PRNG).

9. The mobile apparatus of claim 6, wherein the display driver integrated circuit normally drives the display panel when the first encryption text and the second encryption text are identical.

10. The mobile apparatus of claim 9, wherein the display driver integrated circuit does not drive the display panel when the first encryption text and the second encryption text are different.

11. The mobile apparatus of claim 9, wherein the display driver integrated circuit controls the display panel to display only a predetermined image when the first encryption text and the second encryption text are different.

12. The mobile apparatus of claim 6, wherein the random number generator transmits the random number to the second encryption block through a mobile industry processor interface (MIPI), and
wherein the second encryption block transmits the second encryption text to the comparison block through the MIPI.

13. The mobile apparatus of claim 6, wherein the first shared key and the second shared key are identical.

14. A mobile apparatus for performing a genuine product certification procedure, comprising:
a display panel;
a display driver; and
an application processor configured to transmit display data to the display driver,
wherein the display driver comprises:
a seed generation block configured to generate a seed based on a unique value for the display driver;
a first encryption block configured to generate a first encryption text by encrypting the seed; and
a comparison block configured to receive a second encryption text from the application processor, to compare the first encryption text with the second encryption text, and to control the display panel based on the comparison result, wherein when the first encryption text and the second encryption text are identical the genuine product certification procedure is passed indicating that the application processor is not a counterfeit and when the first encryption text and the second encryption text are different the genuine product certification procedure is failed, and
wherein the application processor comprises:
a second encryption block configured to receive the seed from the display driver, and to generate the second encryption text by encrypting the seed.

15. The apparatus of claim 1, wherein the first shared key and the second shared key are identical.

16. The apparatus of claim 1, wherein the random number generator comprises a true random number generator (TRNG) or a pseudo-random number generator (PRNG).

17. The apparatus of claim 1, wherein the random number generator generates the random number when the display driver integrated circuit wakes up.

18. The apparatus of claim 1, wherein each of the first and second encryption blocks includes a public key encryption algorithm.

19. The mobile apparatus of claim 14, wherein the unique value comprises at least one of a first chip identification (ID) and a fusing value stored in the display driver.

20. The mobile apparatus of claim 14, wherein when the first encryption text and second encryption text are identical, the display driver normally drives the display panel, and
when the first encryption text and second encryption text are different, the display driver drives the display panel to display only a predetermined image.

* * * * *